UNITED STATES PATENT OFFICE.

CLAUDE AUGUSTUS STEWART, OF WILLOUGHBY, SYDNEY, NEW SOUTH WALES, AUSTRALIA.

CASE-HARDENING PREPARATION.

1,379,319.      Specification of Letters Patent.      Patented May 24, 1921.

No Drawing.      Application filed August 9, 1918. Serial No. 249,155.

*To all whom it may concern:*

Be it known that I, CLAUDE AUGUSTUS STEWART, a subject of the King of Great Britain and Ireland, residing at Church street, Willoughby, Sydney, in the State of New South Wales, Commonwealth of Australia, have invented certain new and useful Improvements in Case-Hardening Preparations, of which the following is a specification.

The purpose of this invention is to provide a preparation for use in casehardening steel and iron which will be more efficient and more quickly produce the required result than other preparations hitherto used for this purpose.

A common material for use in casehardening is wood charcoal, and this has I believe been hitherto used only in powdered form which when packed about the article to be treated, acts more or less in the nature of an insulator, offering resistance to the penetration of heat and to the circulation or passage of the gases.

In my preparation I substitute for the finely crushed material referred to, one consisting of coarse granulations of a size to permit the easy passage of the gases through the mass of material and thus accelerate and expedite the heating process more particularly where large muffles are used.

My preparation consists of wood charcoal in the form herein described impregnated with a re-agent consisting of a carbonate of the alkali or alkaline earth groups from which, under the action of applied heat in a muffle, there is evolved carbonic acid gas converted by contact with the red-hot charcoal into carbon monoxid gas (the active carburizing agent) and additional to that produced from the charcoal and occluded air, so that the total amount of gas produced from my preparation is much greater than that from a similar bulk of ordinary charcoal. I have found that suitable and particularly effective re-agents are soda-ash, sodium carbonate and sodium bi-carbonate.

The proportion of re-agent to charcoal varies in use according to the carburizing effect required and the material to be treated, from $2\frac{1}{2}$ per cent. up to 25 per cent. The preparation may be less active *i. e.* contain a smaller proportion of the re-agent, when cementation is required to effect a lesser degree of carburization or when carburization may be partially retarded and requires to be more active when greater degrees of carburization are necessary. Different classes of steel require greater or less activity in the compound—for instance, nickel when alloyed with steel retards the absorption of carbon and the treatment of such an alloy without undue delay would require the use of a compound containing from 15 to 25 per cent. of the re-agent whereas the treatment of ordinary iron for general industrial purposes would require only from $2\frac{1}{2}$ to $7\frac{1}{2}$ per cent. Allowance would need to be made also in dealing with different classes of charcoal, the specific gravity of which varies considerably.

I have found that the most efficient preparation for use in large muffles is obtained by granulating and grading charcoal so that particles pass through a sieve with a mesh of $\frac{3}{8}$ of an inch but will be retained by one of $\frac{3}{16}$ of an inch mesh, whereas the grade most suitable for use in small muffles is that which will pass through a $\frac{3}{16}$ of an inch mesh and will be retained by one carrying 50 meshes to the inch.

The large grade is preferred for use in large muffles because it is easily permeable to heat and the gases circulate freely between the interstitial spaces of the grains, the small grade being preferred for small muffles because the insulating effect is not so marked and the smaller grains pack well in the interstitial spaces and angular depressions.

The re-agent is dissolved in a body of water just sufficient to take up and hold in solution the required quantity and to moisten the whole body of charcoal, but the aqueous solution is less in quantity than the charcoal is capable of absorbing. The moistened mass is allowed to stand for at least 24 hours during which time impregnation is completed, the heat evolved in the mass assisting in the process. After sufficient time has been allowed to permit of impregnation, any superfluous fluid is drained off and the material thoroughly dried by any convenient method which will expel or evaporate the moisture without agitating the material to an extent which would remove the coating of re-agent from the surfaces of the charcoal particles. When this process has been completed, the charcoal particles will be found to be coated and impregnated with the re-agent.

What I claim and desire to secure by Letters Patent is:—

The process of preparing a case hardening compound, consisting in immersing a predetermined quantity of charcoal granules in a less quantity than the charcoal is capable of absorbing, of an aqueous solution of a member of the alkali group; mixing the same; allowing the mixture to stand until the point of impregnation is reached, and expelling the contained moisture by heat.

Signed at Sydney, New South Wales, this third day of July, 1918.

CLAUDE AUGUSTUS STEWART.